Patented Dec. 2, 1930

1,783,560

UNITED STATES PATENT OFFICE

KARL EISENMANN, OF LUDWIGSHAFEN-ON-THE-RHINE, AND FRIEDRICH BERGMANN, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MAGNETIC CORE

No Drawing. Application filed March 18, 1929, Serial No. 348,127, and in Germany March 30, 1928.

The present invention relates to the production of improved magnetic cores.

Magnetic composition cores such as are used for Pupin coils, magnets and the like, can be produced from metallic powders by intimately mixing the same with an insulating material and then pressing the mixture into the desired shape under heavy pressure.

We have now found that particularly favourable results as regards effective permeability are obtainable when such cores are made up with the aid of an insulating material which comprises Montan wax. We may use for the said purpose crude or bleached Montan wax, which latter can be prepared for example by oxidizing crude Montan wax with chromic acid in glacial acetic acid, or conversion products thereof as can be obtained for example by completely or partially converting the free organic acids present in the bleached Montan wax into salts or esters or converting the carboxyl groups of the said acids into other groups containing the CO-group which do not contain a carboxyl hydrogen atom, or converting part of the free organic acids present in the bleached wax into esters and another part into salts or mixtures of salts and, if desired, mixing two or more of such products by fusion.

According to our invention, the cores or the like are produced by impregnating the metallic powder with a Montan wax and subjecting the resulting mass to a high pressure, thereby bringing it into the desired shape. The impregnation of the metallic powder may be effected by mixing it with a powdery Montan wax, but we prefer to mix the metallic powder with a solution thereof and drying the resulting mass.

The metallic powder employed for the production of the cores is preferably made from a carbonyl of the corresponding metal, for example by thermal decomposition in such a manner that the carbonyl is mainly decomposed without coming into contact with hot walls or other parts of the decomposition vessel.

The following example will further illustrate the nature of the invention which however is not restricted thereto.

Example 8 kilograms of iron powder prepared by the thermal decomposition of iron carbonyl are mixed in a suitable kneading machine with a solution in benzene (of 7.5 per cent strength) of 240 grams of a product obtainable by partly esterifying the acids contained in bleached Montan wax with an alcohol and converting the remainder of the acids into salts. When intimate mixing has been attained, the whole of the benzene is driven off in vacuo at about 80° to 85° C. The iron powder impregnated in this manner is formed into rings under a pressure of about 7000 kilograms per sq. cm., in a mould. A core constructed from three of such rings and provided with a single layer of winding, has the specific gravity 6.52 and a permeability of $\mu = 38.6$.

What we claim is:—

1. As new articles of manufacture, magnetic cores comprising a metallic powder having magnetic properties and a Montan wax.

2. As new articles of manufacture, magnetic cores comprising iron powder and a Montan wax.

3. As new articles of manufacture, magnetic cores comprising iron powder obtained from iron carbonyl and a Montan wax.

In testimony whereof we have hereunto set our hands.

KARL EISENMANN.
FRIEDRICH BERGMANN.